H. L. ALBERT.
STEERING MECHANISM FOR TRACTORS.
APPLICATION FILED SEPT. 4, 1915.
Patented July 18, 1916.
2 SHEETS—SHEET 2.
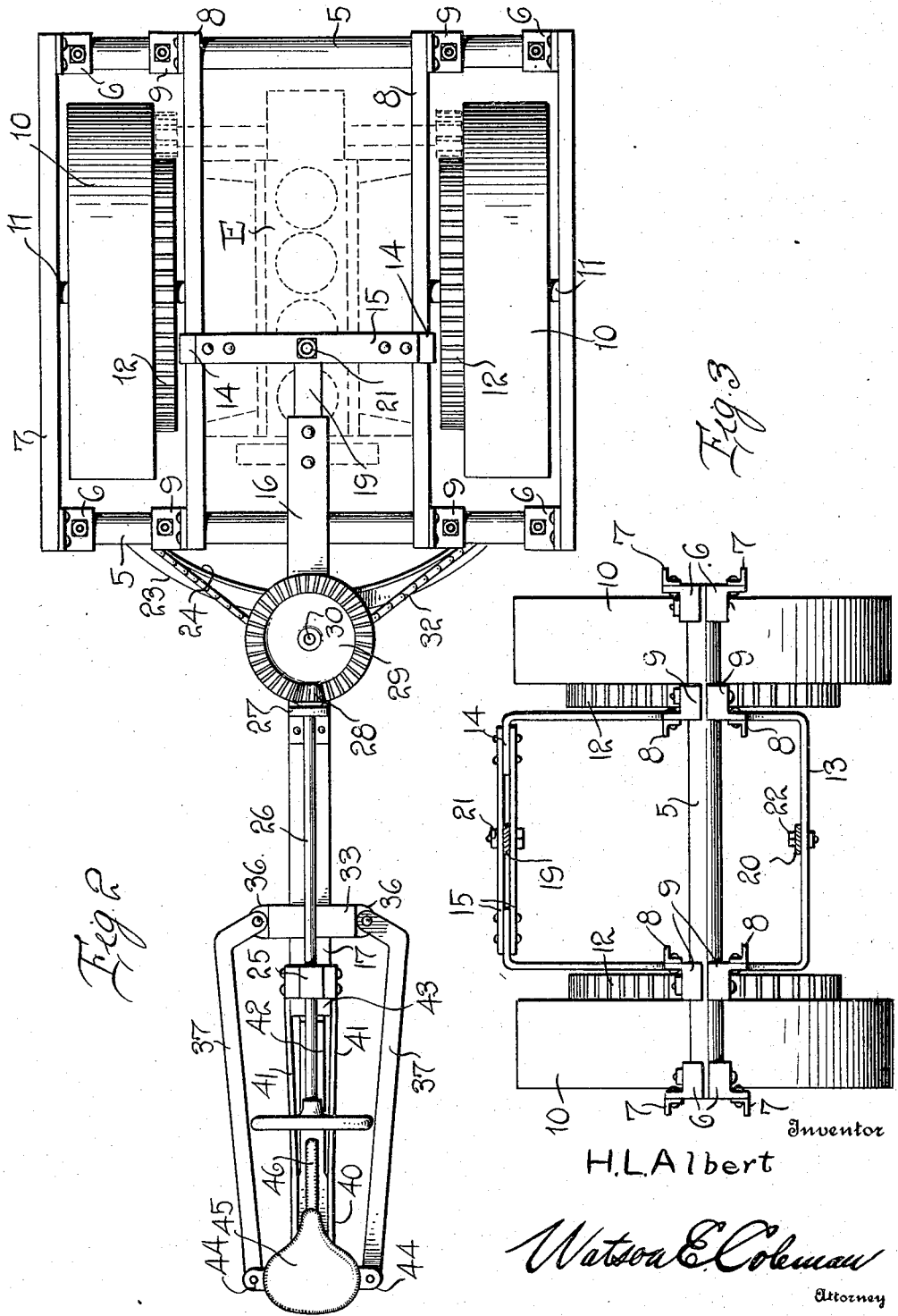
Inventor
H. L. Albert

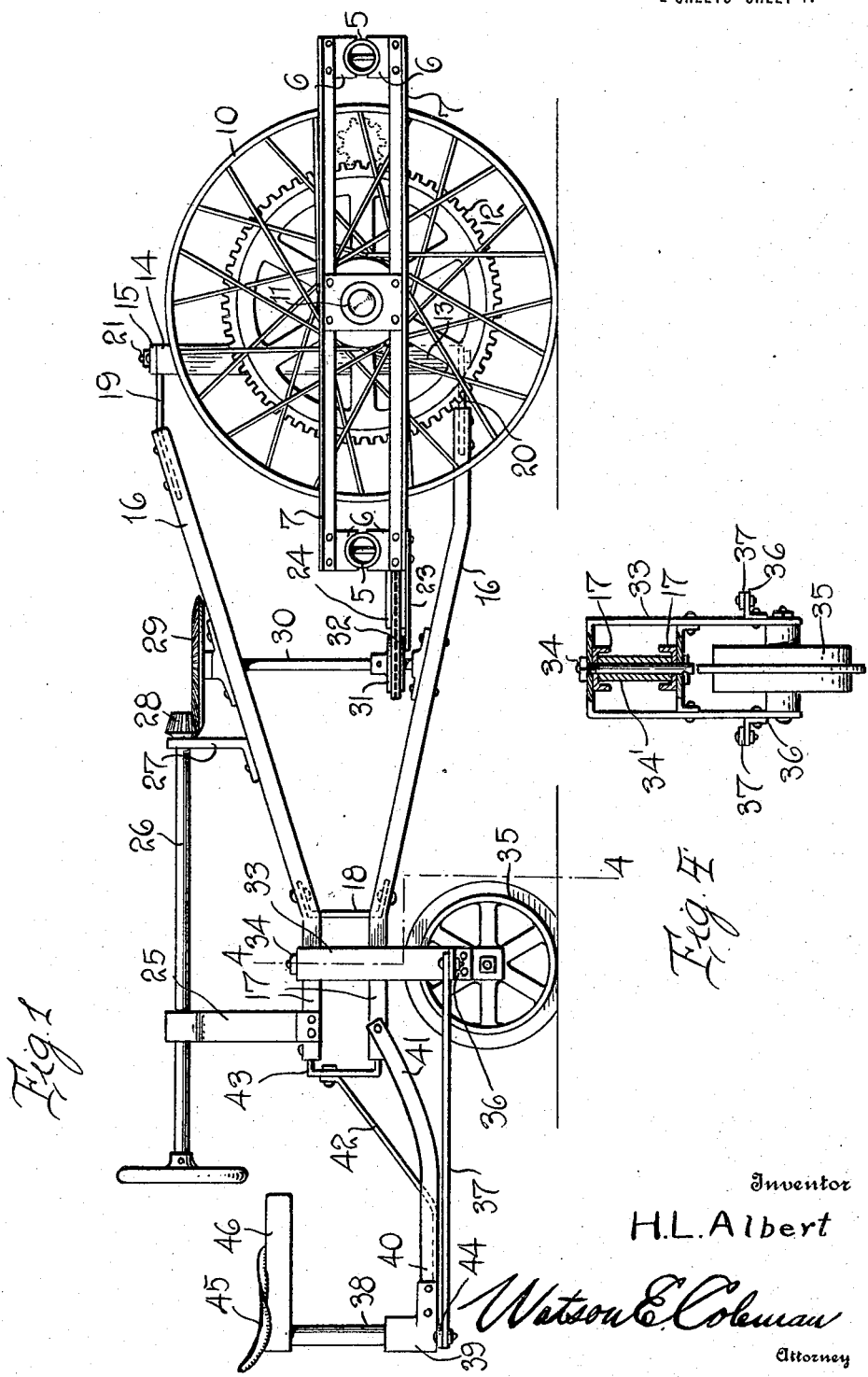

UNITED STATES PATENT OFFICE.

HERMAN L. ALBERT, OF JUD, NORTH DAKOTA.

STEERING MECHANISM FOR TRACTORS.

1,191,267.      Specification of Letters Patent.      Patented July 18, 1916.

Application filed September 4, 1915. Serial No. 49,029.

*To all whom it may concern:*

Be it known that I, HERMAN L. ALBERT, a citizen of the United States, residing at Jud, in the county of Lamoure and State of North Dakota, have invented certain new and useful Improvements in Steering Mechanism for Tractors, of which the following is a specification, reference being had to the accompanying drawings.

This invention relates to improved steering mechanism for tractors and has for its primary object to provide simple and positively operating means whereby heavy field tractors may be easily steered or guided.

The invention has for an additional object to provide in combination with a tractor embodying positively driven ground wheels and a rear supporting caster; steering gear mechanism connected to the frame in which the driving wheels are mounted and manually operable to turn the said frame upon a vertical axis, and means operable from the driver's seat for angularly positioning the caster wheel with respect to the line of movement of the machine.

It is a further general object of the invention to improve and simplify the construction of steering mechanisms of the above character and provide such a mechanism which will be extremely strong and durable as well as reliable and efficient in practical use.

With the above and other objects in view, my invention consists in the novel features of construction, combination and arrangement of parts to be hereinafter more fully described, claimed and illustrated in the accompanying drawings, in which, Figure 1 is a side elevation of a field tractor equipped with my improved steering mechanism; Fig. 2 is a top plan view; Fig. 3 is a front end elevation; and Fig. 4 is a transverse section taken on the line 4—4 of Fig. 1.

In the illustrated embodiment of the invention, I have shown a tractor including a frame which consists of the spaced transversely disposed cylindrical frame bars 5, the ends of which are rigidly secured by means of the castings 6 to the spaced longitudinally extending angle bars 7. Similar spaced angle bars 8 are also connected to these transverse frame bars 5 inwardly of the outer pairs of angle bars 7, by means of the castings 9. Between the spaced pairs of angle bars 7 and 8 at each side of the machine frame, the ground wheels 10 are arranged, the axles 11 of said wheels being journaled in suitable bearings secured between the vertically spaced angle bars. Each of these wheels carries upon its inner face, a gear 12 for engagement by a driving pinion on one end of the engine shaft. The engine E may be suitably mounted upon the inner pairs of angle bars 8. The main frame of the machine also includes a vertically disposed, inverted U-shaped bar 13, the parallel portions of which are bolted or otherwise rigidly secured to the inner pairs of angle bars 8. The upper ends of the bar 13 are angularly bent inwardly and transversely disposed, as shown at 14. These inwardly extending extremities of the bar 13 are connected rigidly together by the spaced bars 15.

A pair of channel bars 16 extends rearwardly from the wheel supported frame above referred to, and are convergently disposed to a point adjacent their rear ends, from which point the channel bars are extended rearwardly in parallel relation to each other, as at 17. Adjacent their rear ends, the spaced channel bars are connected by a vertical brace 18. To the forward ends of the bars 16, the longitudinally projecting plates 19 and 20, respectively, are securely bolted. The upper plate 19 is disposed between the spaced transverse bars 15 and held in connection therewith by the pivot bolt 21. The lower plate 20 is also connected by means of a pivot bolt 22 to the lower transverse portion of the bar 13. To the rear ends of the lower outer angle bars 7, the extremities of a sector 23 are secured. This sector is of angular form and is provided upon its inner edge with the vertically disposed flange 24.

Upon the rear end portion 17 of the upper channel bar 16, a bearing standard 25 is fixed, in the upper end of which the manually operable steering shaft 26 is rotatably mounted. The forward end of this shaft is supported in a bearing bracket 27 and equipped with a bevel pinion 28 which meshes with a bevel gear 29 fixed upon the upper end of a vertical shaft 30 journaled in bearings secured upon the channel bar 16. Upon the shaft 30, adjacent its lower end, a sprocket wheel 31 is secured, and this wheel is traversed by the chain 32. The extremities of the chain 32 are fixed to the vertical flange 24 of the sector 23 adjacent the opposite ends thereof.

A vertically disposed, inverted U-shaped bar or yoke member 33 is swiveled intermediate of its ends upon a bolt 34 extending through the rear end portion 17 of the channel bar 16 and, upon said bolt, between the channel bars, a spacing sleeve 34' is arranged. Between the lower extremities of this yoke bar 33, the caster wheel 35 is journaled. Angle brackets 36 are secured upon the vertical portions of the yoke 33, adjacent the journal or axle of the wheel 35, and to these angle brackets, the connecting bars 37 are pivotally attached at their forward ends.

38 designates a vertical seat post which is mounted to rotate at its lower end in a bearing 39 fixed to the rear end of a channel bar 40. The side flanges of this channel bar, for the greater portion of their length, are separated from the medial portion of the bar and extended forwardly, as at 41, and riveted to the rear end of the lower channel bar 16. The medial portion of the channel bar 40 is obliquely extended upwardly, as at 42, and bolted or riveted to a vertical brace member 43 which connects the extremities of the parallel portions 17 of the channel bars 16. To the lower end of the seat post 38, a transversely disposed bar 44 is fixed intermediate of its ends, and to the extremities of said bar, the rear ends of the connecting bars 37 are pivotally attached.

45 designates the operator's seat fixed upon the upper end of the post 38, and immediately beneath the seat, a forwardly projecting knee engaging plate or arm 46 is fixed upon said post.

Having above set forth the several structural features of my invention, the manner of its operation will be understood as follows. In guiding the machine in its movement across the field, when it is necessary to avoid rocks or other obstructions, the entire frame body of the machine, together with the driving wheels 10, may be readily turned to the necessary angle with respect to the channel bars 16, by a rotation of the steering shaft 26 in the proper direction. It will, of course, be understood that when said shaft is rotated, the vertical shaft 30 is also actuated to pull the sprocket chain 32 in one direction or the other. This chain being connected to the rear end of the main frame upon opposite sides of the transverse center of the machine will obviously swing or turn the machine frame and driving wheels to an angular position with respect to the line of movement of the machine. The operator may, at the same time and without removing his hands from the wheel on the shaft 26, angularly position the caster wheel 35 by engaging one of the knees against one side of the horizontal arm 46 and forcing said arm in one direction or the other. The seat post 38 will thereby be rotated to shift the connecting bars 37 in relatively opposite directions and thus turn the wheel carrying yoke 33 to a transverse angular position with respect to the channel bars 16. In the ordinary steering or guiding movement of the vehicle, the adjustment of the caster 35 may alone be relied upon; but when it is desired to make a quick or sharp turn of the machine on reaching the end of the field, both driving wheels and the caster wheel are simultaneously turned in the manner above described.

From the foregoing description, taken in connection with the accompanying drawings, the construction, manner of operation and several advantages of my improved steering mechanism will be clearly and fully understood. The invention, while exceedingly simple, is obviously reliable and positive in the operation of its several parts. The mounting and relative arrangement of the elements result in an exceedingly durable structure and one which is capable of withstanding the severe usage to which such machines are frequently subjected. It is, of course, manifest that the invention is not limited in its utility to a tractor of the particular construction above set forth, but may also be advantageously employed upon various other types of such machines. My improved steering mechanism is also susceptible of various other modifications in the form, proportion and arrangement of the several elements thereof and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with a tractor including a longitudinally extending frame, a wheel supported frame mounted upon the forward end of the longitudinal frame for turning movement upon a vertical axis, and a caster wheel mounted upon the rear end of the longitudinal frame, of a vertically disposed seat post, operating connections between the lower end of the seat post and the caster wheel, means for turning the wheel supported frame upon its axis, and means on the seat post whereby said post may be turned to simultaneously position the caster wheel at an angle with respect to the line of movement of the machine.

2. The combination with a tractor including a longitudinally disposed frame, a wheel supported frame mounted upon the forward end of said longitudinal frame for turning movement upon a vertical axis, a caster wheel mounted for angular turning movement upon the rear end of said longitudinal frame, of a rotatably mounted seat post, a transversely disposed bar fixed intermediate of its ends upon the lower end of said post, connecting bars between the extremities of the transverse bar and the caster wheel, hand operated means mounted upon the longitudinal frame and connected to the wheel supporting frame to turn the latter to an angular position with respect to the line of movement of the machine, and a knee engaging arm fixed upon the upper end of the seat post whereby said post may be rotated to simultaneously turn the caster wheel to an angular position.

3. In steering mechanism of the character described, a pivotally mounted frame, a caster wheel rotatable therein, a rotatably supported seat post spaced from said frame, and an operative connection between said seat post and pivoted frame whereby the caster wheel may be disposed at an angle with respect to the line of movement of the machine by a turning movement of the seat post.

4. In steering mechanism of the character described, a pivotally mounted frame, a caster wheel rotatable therein, a rotatably supported seat post spaced from said frame, a rigid member operatively connecting the seat post to said frame, and manually operable means fixed to the seat post for turning said post whereby the caster wheel may be disposed at an angle with respect to the line of movement of the machine.

In testimony whereof I hereunto affix my signature in the presence of two witnesses.

HERMAN L. ALBERT.

Witnesses:
MANUEL F. BLANCO,
BRYAN RANEY.

Copies of this patent may be obtained for five cents each, by addressing the "Commissioner of Patents, Washington, D. C."